(12) United States Patent
Ashner et al.

(10) Patent No.: US 9,832,128 B1
(45) Date of Patent: Nov. 28, 2017

(54) DYNAMIC ADVERTISEMENT ROUTING

(71) Applicant: Engine Media, LLC, Princeton, NJ (US)

(72) Inventors: Louis Clayton Ashner, New York, NY (US); John Patrick Roach, New York, NY (US); Michael Zacharski, Pawling, NY (US)

(73) Assignee: ENGINE MEDIA, LLC, Princeton, NJ (US)

( * ) Notice: Subject to any disclaimer, the term of this patent is extended or adjusted under 35 U.S.C. 154(b) by 0 days.

(21) Appl. No.: 15/463,820

(22) Filed: Mar. 20, 2017

(51) Int. Cl.
| | |
|---|---|
| *H04L 12/26* | (2006.01) |
| *H04L 1/00* | (2006.01) |
| *H04L 12/803* | (2013.01) |
| *H04L 29/08* | (2006.01) |
| *H04L 12/741* | (2013.01) |
| *H04L 12/751* | (2013.01) |

(52) U.S. Cl.
CPC ........ *H04L 47/125* (2013.01); *H04L 43/0888* (2013.01); *H04L 43/10* (2013.01); *H04L 43/16* (2013.01); *H04L 45/02* (2013.01); *H04L 45/54* (2013.01); *H04L 67/1027* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 8,831,987 B2 | 9/2014 | Knapp et al. | |
| 8,983,859 B2 | 3/2015 | Nice et al. | |
| 2003/0065763 A1* | 4/2003 | Swildens | ............... H04L 12/14 709/224 |
| 2008/0065479 A1 | 3/2008 | Tomlin et al. | |
| 2008/0228564 A1 | 9/2008 | de Heer et al. | |
| 2009/0190482 A1* | 7/2009 | Blair | .................. H04L 43/0858 370/250 |
| 2010/0145809 A1 | 6/2010 | Knapp et al. | |
| 2011/0040635 A1 | 2/2011 | Simmons et al. | |

(Continued)

OTHER PUBLICATIONS

B. Levine, Ad Exchange bRealTime Launches Biddr+ for Header Bidding, Jan. 19, 2017.

(Continued)

*Primary Examiner* — Edan Orgad
*Assistant Examiner* — Rebecca Song
(74) *Attorney, Agent, or Firm* — K&L Gates LLP

(57) ABSTRACT

Dynamic advertisement routing is disclosed. For example, a plurality of internet protocol ("IP") addresses associated with respective plurality of target nodes is stored in a routing pool. Each IP address in the routing pool is pinged through each of first and second load balancer network interfaces. Network routes associated with target nodes are updated based on a first plurality of ping responses. Communications sessions are established with target nodes through respective network routes. IP addresses are pinged and respective latencies in a latency cache are updated based on a second plurality of ping responses. A first request directed to the plurality of target nodes is received and is determined to be sent to a first target node based on the latency cache forwarded to the first target node via the first network route.

35 Claims, 7 Drawing Sheets

(56) References Cited

U.S. PATENT DOCUMENTS

| | | | |
|---|---|---|---|
| 2011/0075582 A1* | 3/2011 | Sugiyama | H04L 41/5035 370/252 |
| 2012/0144023 A1* | 6/2012 | Guest | H04L 61/1511 709/224 |
| 2013/0066705 A1 | 3/2013 | Umeda | |
| 2013/0117427 A1* | 5/2013 | Amano | G06F 9/4416 709/223 |
| 2014/0058849 A1 | 2/2014 | Saifee et al. | |
| 2014/0105024 A1* | 4/2014 | Yu | H04L 12/413 370/235 |
| 2015/0051986 A1 | 2/2015 | Saifee et al. | |
| 2015/0120468 A1 | 4/2015 | Knapp et al. | |
| 2015/0154650 A1 | 6/2015 | Umeda | |
| 2015/0310500 A1 | 10/2015 | Nolet et al. | |
| 2016/0164784 A1* | 6/2016 | Amemiya | H04L 47/29 709/235 |

OTHER PUBLICATIONS

Amazon Web Services, Advertising Serving, May 2012.
Amazon Web Services, Building a Real-Time Bidding Platform on AWS, Feb. 2016, https://d0.awsstatic.com/whitepapers/Building_a_Real_Time_Bidding_Platform_on_AWS_v1_Final.pdf.
Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.
B. Levine, Ad Exchange bRealTime Launches Biddr+ for Header Bidding, Jan. 19, 2016.

* cited by examiner

DYNAMIC ADVERTISEMENT ROUTING

BACKGROUND

The present disclosure generally relates to advertising on network accessible devices. As microprocessors have become more efficient, and network connectivity more prevalent, an ever increasing amount of devices now have internet or intranet enabled capabilities and features. With the network capabilities of network accessible devices, come opportunities for users to consume content, and therefore opportunities for publishers of content to advertise to these users. Advertisers are presented with ever increasing opportunities to reach their increasingly accessible consumers through a myriad of network accessible devices used by these consumers on a daily basis. As such, computing and networking speed is of paramount importance for advertisers to take advantage of opportunities to present advertisements as these opportunities arise.

SUMMARY

The present disclosure provides a new and innovative system, methods and apparatus for dynamic advertisement routing. In an example, a plurality of internet protocol addresses including first, second, and third internet protocol addresses are stored in a routing pool. In the example, the first internet protocol address is associated with a first target node of the plurality of target nodes, the second internet protocol address is associated with a second target node of the plurality of target nodes, and the third internet protocol address is associated with a third target node of the plurality of target nodes. Each of the plurality of internet protocol addresses in the routing pool, including at least the first, second, and third internet protocol addresses, is pinged through each of a first load balancer network interface and a second load balancer network interface. At least one of a first network route to the first target node, a second network route to the second target node, and a third network route to the third target node is updated based on a first plurality of ping responses. First, second, and third communication sessions are established with the respective first, second and third target nodes, respectively through first, second, and third network routes. The first, second, and third internet protocol addresses are pinged. First, second, and third latencies in a latency cache are updated based on a second plurality of ping responses. A request directed to the plurality of target nodes is received. The request is determined to be sent to the first target node based on the latency cache. The request is then forwarded to the first target node via the first network route.

Additional features and advantages of the disclosed method and apparatus are described in, and will be apparent from, the following Detailed Description and the Figures.

DETAILED DESCRIPTION OF EXAMPLE EMBODIMENTS

Figure 1:
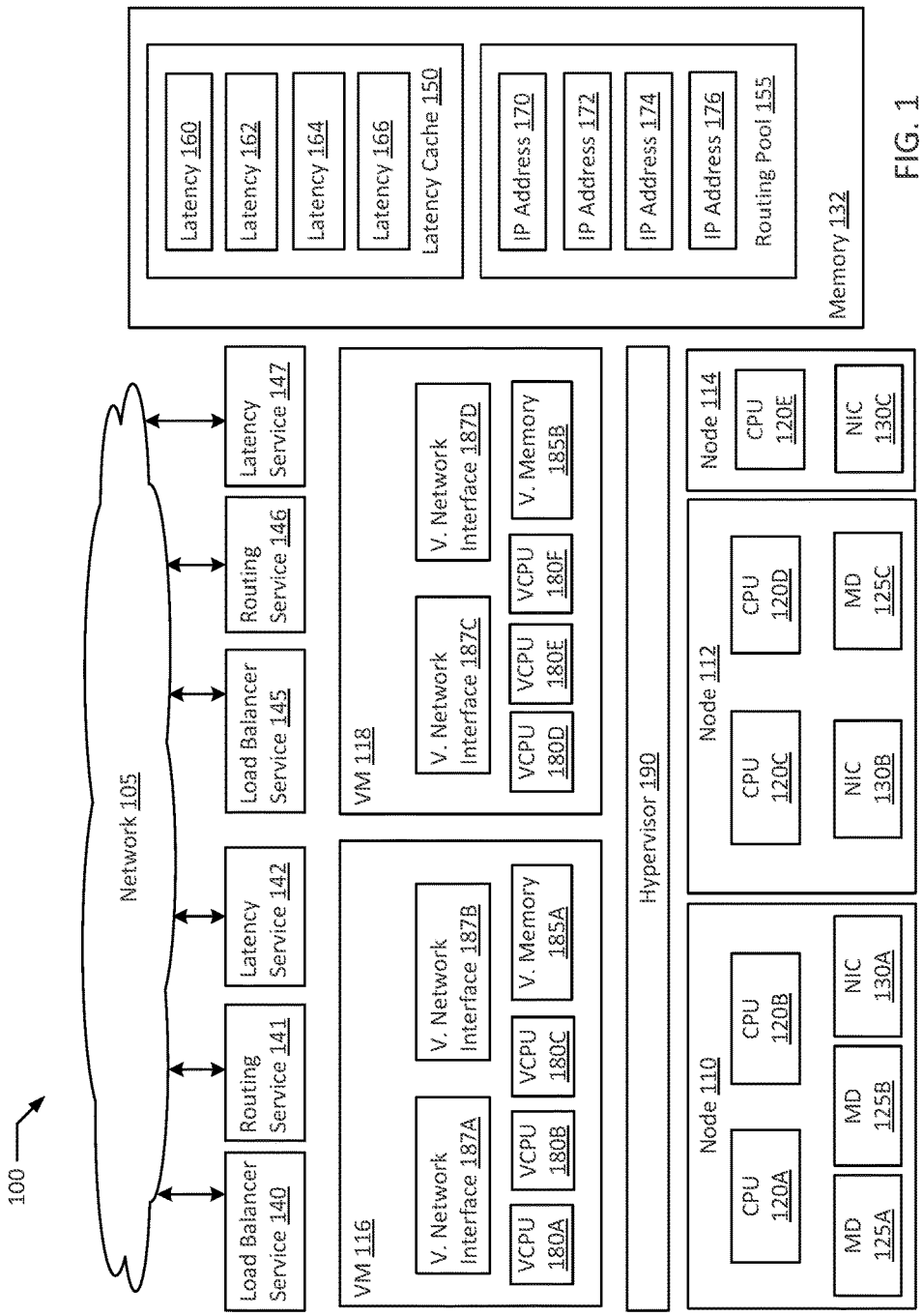
FIG. 1 is a block diagram of a dynamic advertisement routing system according to an example of the present disclosure.

As network accessible devices increasingly gain popularity, opportunities to advertise on such network accessible devices increase. With the vast variety of devices capable of presenting audio and visual advertisements ("ads"), comes numerous opportunities to display ads, and also competition for the advertising opportunities or ad slots. Response time may therefore be critical for maximizing both the likelihood of securing an ad slot as well as the effectiveness of a given ad slot. As users typically expect perceivably immediate responses when accessing content online, the entire process for negotiating, selecting, and displaying an ad may typically be completed in under one second. In a typical day, billions of ads may be served to consumers on network accessible devices. To handle these requests for ads, publishers, ad agencies, and/or advertisers may typically implement load balancers to distribute network traffic to individual nodes to handle individual requests.

In a typical advertising exchange implementation, a user on a network accessible device may access content supplied by a publisher. The publisher may incorporate ads in the content, and seek prospective buyers for the ads in the content in real-time while the content is loading. An ad agency may, upon receipt of a request to bid on a given ad slot, seek advertisers either directly or through an advertising exchange to purchase the ad slot. In an example, to maintain a positive user experience for the content, a publisher may require response within a certain critical time threshold. In an example, network latency may account for a significant proportion of the time spent handling a given request.

A typical server may be limited in the number of network connections it may maintain with a given target based on, for example, an availability of ports with which to establish these connections. In a typical example, a given network connection may require a handshaking process that may be required to navigate several internal system queues before an initial handshake message is even sent, and several messages generally need to be exchanged to establish a secure network communication session. For example, a request may generally originate from software requiring a network connection, the software's request may be queued by the operating system to be packaged for a network interface such as a network interface card ("NIC"), the NIC may then put the request into an outgoing queue before being sent. The NIC and the target server may then perform a multi-step handshake to authenticate encryption keys, each leg of which incurs the full transmission latency between the NIC and the target server (e.g., at least 3 messages transmitted for a secure socket layer ("SSL") connection). Upon successful handshake, each message is then queued by each layer of the system once again before the software sees the response (e.g., NIC receiving queue, system queue, and software queue). In all, a brand new connection could easily take 100 ms-200 ms to establish, even where servers are located relatively close to each other.

A typical network connection may be established by and between two servers, each of which is identifiable through a unique Internet Protocol ("IP") address, which may be a sequence of delimited numerical or hexadecimal digits. For example, IPv4 addresses are typically in the form of four 8-bit digits (e.g., 0-255) delimited by periods (e.g., 255.255.255.0). Meanwhile, IPv6 addresses are typically in the form of eight groups of four hexadecimal digits, each group consisting of 16 bits and separated by colons (e.g., ffff:ffff:ffff:ffff:ffff:ffff:ffff:0). In various other examples, any form of uniquely identifiable address may be used to direct messages between two servers, for example a Media Access Control ("MAC") address. In a typical example, a company such as an advertiser may have its network facing systems represented by a Uniform Resource Locator ("URL") where the IP address of individual servers is hidden behind a domain name and host name representative of the company (e.g., www.enginegroup.com). A Domain Name System ("DNS") may typically be queried by a network interface to resolve a host name URL into an IP address. One advantage is that servers may be interchangeably substituted for each other by updating the DNS without interrupting the availability of the host name URL (e.g., www.enginegroup.com). However, for purposes of routing requests where milliseconds are significant, a query to DNS to resolve a host name URL may take upwards of 10 ms, typically a similar amount of time to sending a message directly to a known IP address. In addition, a company such as an advertiser or ad agency may host dozens, even hundreds or thousands of servers behind a given host name URL, with each individual system potentially offering significantly different performance characteristics. For example, a particular server may be undergoing routine maintenance or running a backup slowing down responses. Multiple servers behind the same host name URL may also be located in different cities or data centers and therefore response latency may be significantly different due to physical proximity.

Network traffic between any two given physical locations may also typically be routed through a series of different relays between point A and point B. Along each step of physically relaying a message from point A to point B, decisions are made regarding which relay node should next receive the message. Often times several possible paths are weighted equally at decision time, and therefore a given path from point A to point B may be different each time a connection is established. For example, a relay node X in Washington D.C. between point A (e.g., in Virginia) and point B (e.g., in New York City) may forward a message to either one of relay node Y (e.g., in Secaucus, N.J.) and node Z (e.g., in Princeton, N.J.) before arriving at a final destination in New York City. On a typical day, the Secaucus relay node Y may perform better than the Princeton relay node Z, for example, because the Secaucus relay node Y may have higher bandwidth capacity into New York City. However, a company may initiate a massive data backup operation through the Secaucus-New York City connection slowing down traffic for anyone else using the same connection, thereby making the path through node Z temporarily faster. In a typical scenario, relay node X may be unaware of any factors preferencing relay node Y over relay node Z or vice versa and select a sub-optimal route.

As a result, a typical network connection may incur several hundred milliseconds of overhead as a result of handshaking and sub-optimal routing that may ultimately frustrate efforts to display ads in a given ad slot. The present disclosure aims to address these inefficiencies in typical network routing systems to significantly cut down on network latency between a load balancer and a target node, thereby increasing the proportion of ad slots responded to in a timely manner. For example, an example system performing dynamic advertisement routing may employ multiple network interfaces (e.g., physical and/or virtualized NICs) to increase port availability and therefore active connections resulting in reduced handshaking for new connections. By implementing multiple NICs, a system is additionally able to establish multiple connections to the same target, which results in additional network routes being established between the source system and the target as the various connections are routed along different relays. Having multiple paths available to select from allows for the selection of a fastest route for a request at a particular given moment. In addition, with the availability of various different connections between source and target, current performance characteristics of each connection may be assessed to determine performance grades for groups of connections, which may then allow for the prioritization of requests based on the performance grades of connections allowing for the optimization of timely responses. In an example, by implementing dynamic advertisement routing as disclosed in the present disclosure, a typical advertisement request response loop may see latency reductions of 50% or more, for example from 500 ms-1000 ms down to 150 ms-250 ms. In addition, a large reduction may be seen in requests that respond too late to be used to fill an ad slot or time out altogether due to periodic verifications of each connection.

FIG. 1 is a block diagram of a dynamic advertisement routing system according to an example of the present disclosure. In an example, dynamic advertisement routing in system 100 may be performed by load balancer service 140, routing service 141, and latency service 142 in conjunction with latency cache 150 and routing pool 155. In an example, load balancer service 140, routing service 141, and latency service 142 may execute on a virtual machine ("VM") 116 that is hosted by a hypervisor 190 which executes on one or more of a plurality of hardware nodes (e.g., nodes 110, 112, and 114). In the example, load balancer service 140, routing service 141, and latency service 142 may connect to target nodes over network 105. In an example, load balancer service 145, routing service 146, and latency service 147 may represent a second set of services executing on VM 118 that are functionally similar to load balancer service 140, routing service 141, and latency service 142.

In an example, network 105 may be any type of network, for example, a public network (e.g., the Internet), a private network (e.g., a local area network (LAN) or wide area network (WAN)), or a combination thereof. In an example devices connected through network 105 may be interconnected using a variety of techniques, ranging from a point-to-point processor interconnect, to a system area network, such as an Ethernet-based network. In an example, load balancer service 140, routing service 141, and latency service 142 may execute on any virtualized or physical hardware connected to network 105. In an example, load balancer service 140, routing service 141, and latency service 142 executes on VM 116 which executes on nodes 110, 112 and 114. The system 100 may include one or more interconnected hosts (e.g., nodes 110, 112 and 114). Each nodes 110, 112 and 114 may in turn include one or more physical processors (e.g., CPU 120A-E) communicatively coupled to memory devices (e.g., MD 125A-C) and network interfaces (e.g., NIC 130A-C). As used herein, physical processor or processors (Central Processing Units "CPUs") 120A-E refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-C refers to a volatile or non-volatile memory device, such as RAM, ROM, EEPROM, or any other device capable of storing data. Each node may also include input/output ("I/O") devices capable of providing an interface between one or more processor pins and an external device, the operation of which is based on the processor inputting and/or outputting binary data. CPUs 120A-E may be interconnected using a variety of techniques, ranging from a point-to-point processor interconnect, to a system area network, such as an Ethernet-based network. In an example, NICs 130A-C may be physical network interfaces capable of connecting each of nodes 110, 112, and 114 to another device, either a physical node (e.g., nodes 110, 112, or 114) or a virtual machine (e.g., VMs 116 and 118). In an example NICs 130A-C may allow nodes 110, 112, and 114 to interconnect with each other as well as allowing nodes 110, 112, and 114 as well as software executing on the nodes (e.g., load balancer service 140, routing service 141, and latency service 142) to connect to remote systems such as target nodes over network 105. Local connections within each of nodes 110, 112 and 114, including the connections between a processor 120A and a memory device 125A-B and between a processor 120A and a NIC 130A may be provided by one or more local buses of suitable architecture, for example, peripheral component interconnect (PCI). In an example, NICs 130A-C may be virtualized as virtual network interfaces 187A-D. For example, physical NIC 130A may act as a relay for a message to or from virtual network interface 187A, with virtual network interface 187A having a different IP address from NIC 130A. In an example, each physical NIC may support multiple virtual network interfaces. In an example, VM 116 may have eight, sixteen, sixty-four or more virtual network interfaces. In the example, additional virtual network interfaces result in additional possible routes between VM 116 and a target node. In a typical example, if only one network route is used, the one network route may deliver a median level of performance. In an example where ten network routes are examined, probability dictates that selecting the best performing network route of the ten options may typically result in a performance in the ninetieth percentile of possible network routes, which may well be a significant performance boost as compared to the fiftieth percentile.

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor or a component (e.g., a virtual machine manager) that executes tasks commonly executed by hypervisors to allocate physical resources to the virtual machine. In an example, VMs 116 and 118 may be virtual machines executing on top of physical hosts (e.g., nodes 110, 112 and 114), possibly with a hypervisor 190 executing between the virtualized layer and the physical hosts. In an example, load balancer service 140, routing service 141, and/or latency service 142 may be further virtualized (e.g., in a container).

In an example, load balancer services 140 and 145, routing services 141 and 146, and latency services 142 and 147 may be connected with a latency cache 150 and a routing pool 155 stored in a memory 132. In an example, memory 132 may be a physical memory store on memory devices 125 A-C. In another example, memory 132 may be a virtual memory store in virtual memories 185A-B. In the example, latency cache 150 may further include latencies 160, 162, 164, and 166, and routing pool 155 may further include IP addresses 170, 172, 174, and 176. In an example, latency cache 150 and routing pool 155 may be stored in volatile storage such as Random Access Memory ("RAM") allowing fast access. In an example, a copy of latency cache 150 may further be stored in cache memory directly on CPUs 120A-C for faster access for routing requests.

In an example, non-transitory copies of latency cache 150 and routing pool 155 may be stored in any suitable type of database, for example, a relational database. In some examples, latency cache 150 and routing pool 155 may be stored in non-volatile storage (e.g., hard disk or flash memory) in addition to volatile storage (e.g., RAM or cache memory). For example, a copy of routing pool 155 may be stored in non-transitory storage that is synchronized and shared between routing service 141 and routing service 146 on separate VMs 116 and 118, but routing service 141 and routing service 146 may each load a working copy of routing pool 155 into local RAM. The latency cache 150 and the routing pool 155 may be stored in a database associated with a database management system (DBMS). A DBMS is a software application that facilitates interaction between the database and other components of the system 300. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the latency cache 150 and routing pool 155 may be stored in a database organized as a formal database with a schema such as a relational schema with defined tables, indices, links, triggers, various commands etc. In some examples, latency cache 150 and routing pool 155 may not be organized as a formal database, but may instead be an alternative storage structure capable of holding the information stored in latency cache 150 and routing pool 155, including but not limited to a file, folder, directory, registry, etc. In an example, latency cache 150 and routing pool 155 is stored in non-volatile storage.

System 100 may run one or more VMs 116 and 118, by executing a software layer (e.g., hypervisor 190) above the hardware and below the VMs 116 and 118, as schematically shown in FIG. 1. In an example, the hypervisor 190 may be a component of a host operating system executed by the system 100. In another example, the hypervisor 190 may be provided by an application running on the host operating system, or may run directly on the nodes 110, 112 and 114 without an operating system beneath it. The hypervisor 190 may virtualize the physical layer, including processors, memory, and I/O devices, and present this virtualization to VMs 116 and 118 as devices, including virtual processors ("VCPU") 180A-F, virtual memory devices 185A-B, virtual network interfaces 187A-D.

In an example, a VM 116 may be a virtual machine and may execute a guest operating system which may utilize the underlying virtual central processing unit ("VCPUs") 180A-C, virtual memory device ("V. Memory") 185A, and virtual network interfaces 187A-B. Load balancer service 140, routing service 141, and latency service 142 may run as applications on VM 116 or may be further virtualized and execute in containers. Processor virtualization may be implemented by the hypervisor 190 scheduling time slots on one or more physical processors 120A-E such that from the guest operating system's perspective those time slots are scheduled on a virtual processors 180A-C.

A VM 116 may run on any type of dependent, independent, compatible, and/or incompatible applications on the underlying hardware and host operating system. In an example, load balancer service 140, routing service 141, and/or latency service 142 running on VM 116 may be dependent on the underlying hardware and/or host operating system. In another example, load balancer service 140, routing service 141, and/or latency service 142 running on VM 116 may be independent of the underlying hardware and/or host operating system. In an example, load balancer service 140, routing service 141, and/or latency service 142 running on VM 116 may be compatible with the underlying hardware and/or host operating system. Additionally, load balancer service 140, routing service 141, and/or latency service 142 running on VM 116 may be incompatible with the underlying hardware and/or OS. The hypervisor 190 may manage memory for the host operating system as well as memory allocated to the VM 116 and guest operating systems. In an example, VM 118 may be another virtual machine similar in configuration to VM 116, with VCPUs 190D-F, virtual memory 185B, and virtual network interfaces 187C-D operating in similar roles to their respective counterparts in VM 116. The VM 116 may host load balancer service 145, routing service 146, and latency service 147.

Figure 2A:
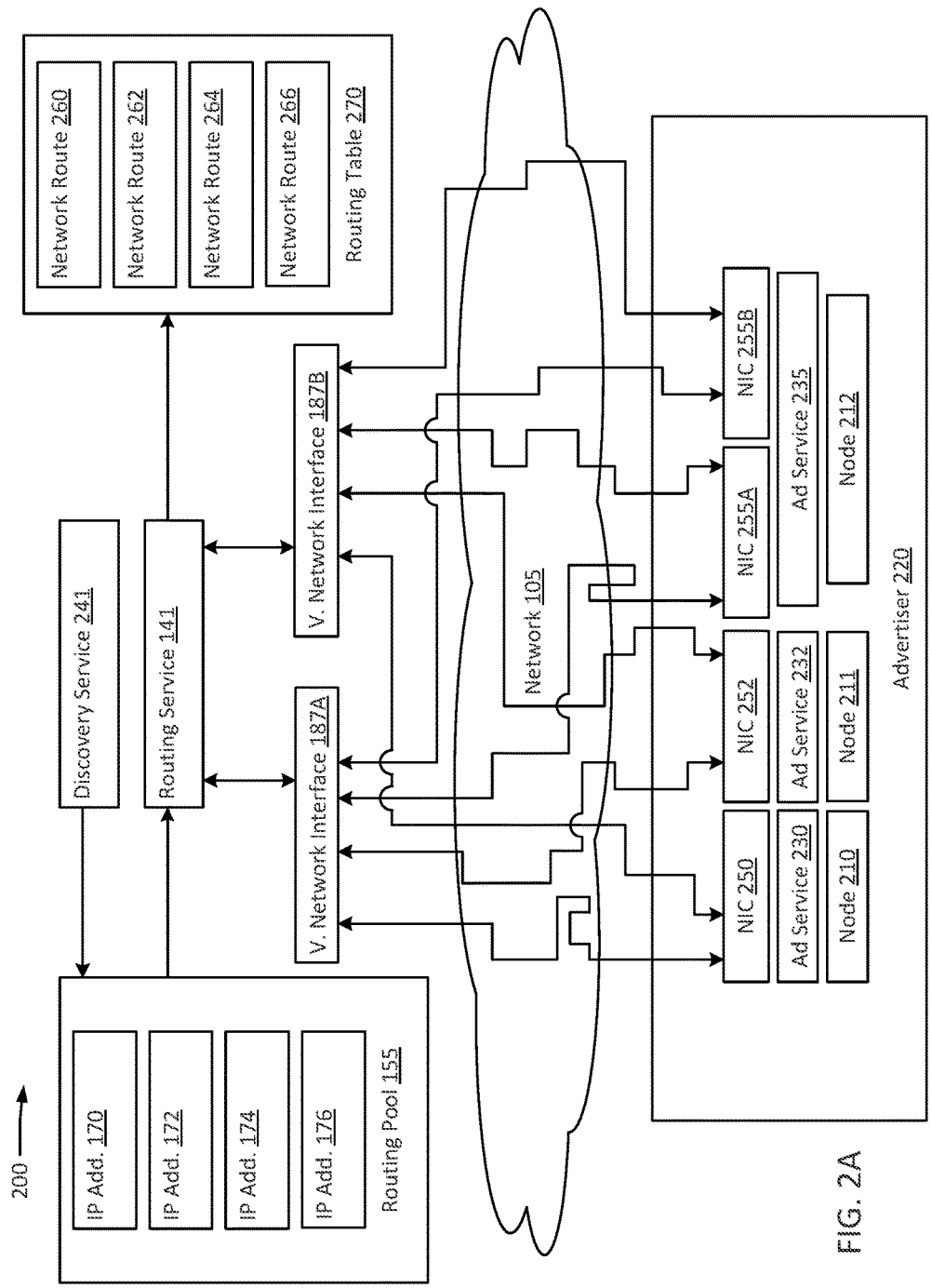
FIG. 2A is a block diagram of dynamic network route detection according to an example of the present disclosure.

FIG. 2A is a block diagram of dynamic network route detection according to an example of the present disclosure. System 200 as illustrated in FIG. 2A shows routing service 141 determining preferred network routes to various IP addresses of advertiser 220. In an example, discovery service 241 and routing service 141 may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). In an example, discovery service 241 may periodically establish connections with a host name URL for advertiser 220, allowing DNS to direct discovery service 241 to a random IP address and node of advertiser 220. In an example, each time discovery service 241 successfully connects to an IP address, the IP address may be added to routing pool 155 (e.g., IP addresses 170, 172, 174, and 176). In the example, discovery service 241 may establish connections without actual payload data (e.g., through pinging the host name URL), or discovery service 241 may send live payload data (e.g., low priority requests with low latency sensitivity). In an example, sending actual data may further validate that a given IP is operational as compared to a ping. In some examples, a frequency at which discovery service 241 is executed may be reduced after new results become sufficiently infrequent to indicate that a vast majority of possible IP addresses have been discovered and added to routing pool 155.

In an example, routing service 141 may have access to two different virtual network interfaces (e.g., V. network interfaces 187A and 187B) through which routing service 141 may connect to advertiser 220. In the illustrated example, advertiser 220 operates three separate hardware nodes 210, 211, and 212, on which three copies of an ad service (e.g., ad services 230, 232 and 235) are executing. In the example, each node 210, 211, and 212 has one or two NICs (e.g., NICs 250, 252, and 255A-B) through which ad services 230, 232, and 235 receive requests. In an example, each NIC (e.g., NICs 250, 252, and 255A-B) may be associated with a separate IP address (e.g., IP Addresses 170, 172, 174, and 176). In the example, routing service 141 may be unable to distinguish whether two IP addresses (e.g., IP addresses 170 and 172) representing two NICs (e.g., NICs 250 and 252) belong to the same copy of an ad service (e.g., ad service 230) executing on one node 210, or to two different copies of the ad service (e.g., ad services 230 and 232) executing on different nodes (e.g., node 210 and 211). In an example, each physical NIC (e.g., NICs 250, 252, and 255A-B) may be virtualized as multiple virtual NICs each with a respective IP address and set of ports. In an example, each node may also include more NICs than depicted (e.g., one node may include eight or more NICs). In an example, routing service 141 may ping each IP address 170, 172, 174, and 176 in routing pool 155 through each of virtual network interfaces 187A and 187B to determine whether connecting to each respective NIC 250, 252, and 255A-B is faster through virtual network interface 187A or 187B. In the example, routing service 141 may set the faster route as a preferred route (e.g., network routes 260, 262, 264, and 266) in a routing table 270. In an example routing table 270 may be a component of a guest operating system of VM 116 on which routing service 141 executes.

Figure 2B:
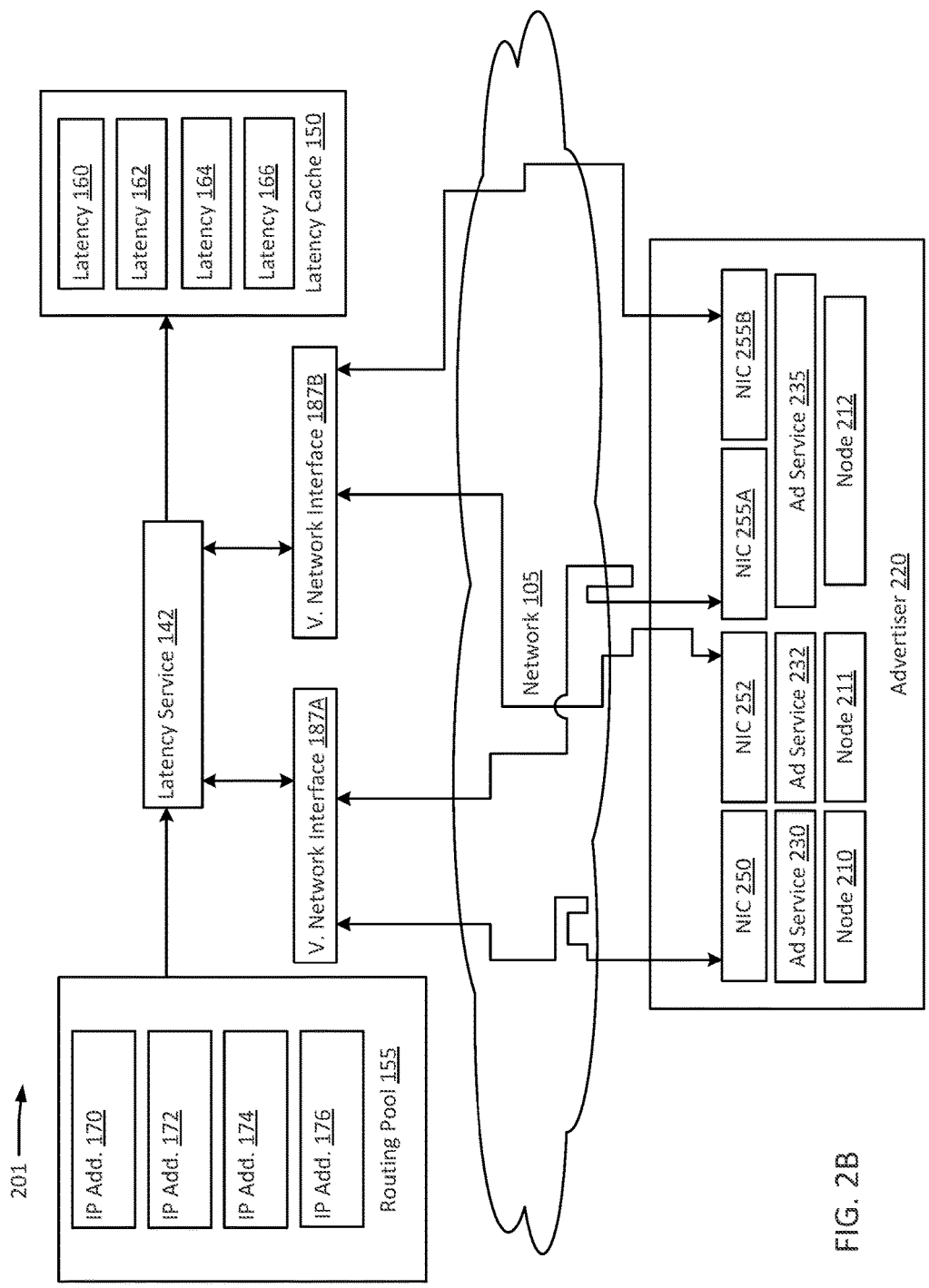
FIG. 2B is a block diagram of dynamic network target selection according to an example of the present disclosure.

FIG. 2B is a block diagram of dynamic network target selection according to an example of the present disclosure. System 201 as illustrated in FIG. 2B shows latency service 142 determining latencies (e.g., latencies 160, 162, 164, and 166) and by extension performance levels of various IP addresses of advertiser 220. In an example, dynamic routes between VM 116 and advertiser 220 have already been discovered by routing service 141 as illustrated in FIG. 2A. In the example, network route 260 may indicate a connection from virtual network interface 187A to NIC 250, network route 262 may indicate a connection from virtual network interface 187A to NIC 255A, network route 264 may indicate a connection from virtual network interface 187B to NIC 252, and network route 266 may indicate a connection from virtual network interface 187B to NIC 255B. In an example, latency service 142 may then ping each IP address (e.g., IP addresses 170, 172, 174, and 176) in routing pool 155 using a system default network route (e.g., network routes 260, 262, 264, and 266 set in routing table 270). In the example, latency service 142 may then store the resulting latencies of the pings as latencies 160, 162, 164, and 166 in latency cache 150.

In an example, routing service 141 and latency service 142 may execute independently of each other. In an example, if a given IP address (e.g., IP address 170) is unresponsive to either routing service 141 or latency service 142's ping, IP address 170 may be flagged in routing pool 155 as being temporarily disabled to avoid waiting repeatedly for attempts to ping IP address 170 to time out. In an example, routing service 141 flagging IP address 170 as temporarily disabled may result in routing service 141, routing service 146, latency service 142, and latency service 147 skipping IP address 170 for a certain time duration and/or a certain number of pinging cycles. In an example, an IP address (e.g., IP address 170) after being unresponsive and/or unavailable for a sufficient number of attempts and/or for a sufficient duration, may be removed from routing pool 155 and placed in a separate inactive list. In an example the separate inactive list may be checked for reactivated target nodes, for example, on a daily basis. In an example, latency service 142 may group latencies 160, 162, 164, and 166 into various performance categories. For example, latency 160 may be flagged as unusable due to a response time greater than a maximal threshold value. Similarly, latency 162 may be flagged as high performance, latency 164 as medium performance, and latency 166 as low performance due to their respective response times. In an example, the performance characterization of each IP address (e.g., IP addresses 170, 172, 174, and 176) and latency (e.g., latencies 160, 162, 164, and 166) pairing may be re-evaluated each time latency service 142 pings a given IP address. In an example, features other than latency may be factored into a decision on prioritization, for example, a number of outstanding requests sent to a particular IP address, or a request response time of the particular IP address. In an example, performance levels may be more or less granular than the three step grouping of high, medium, and low performance in the example above.

Figure 3:
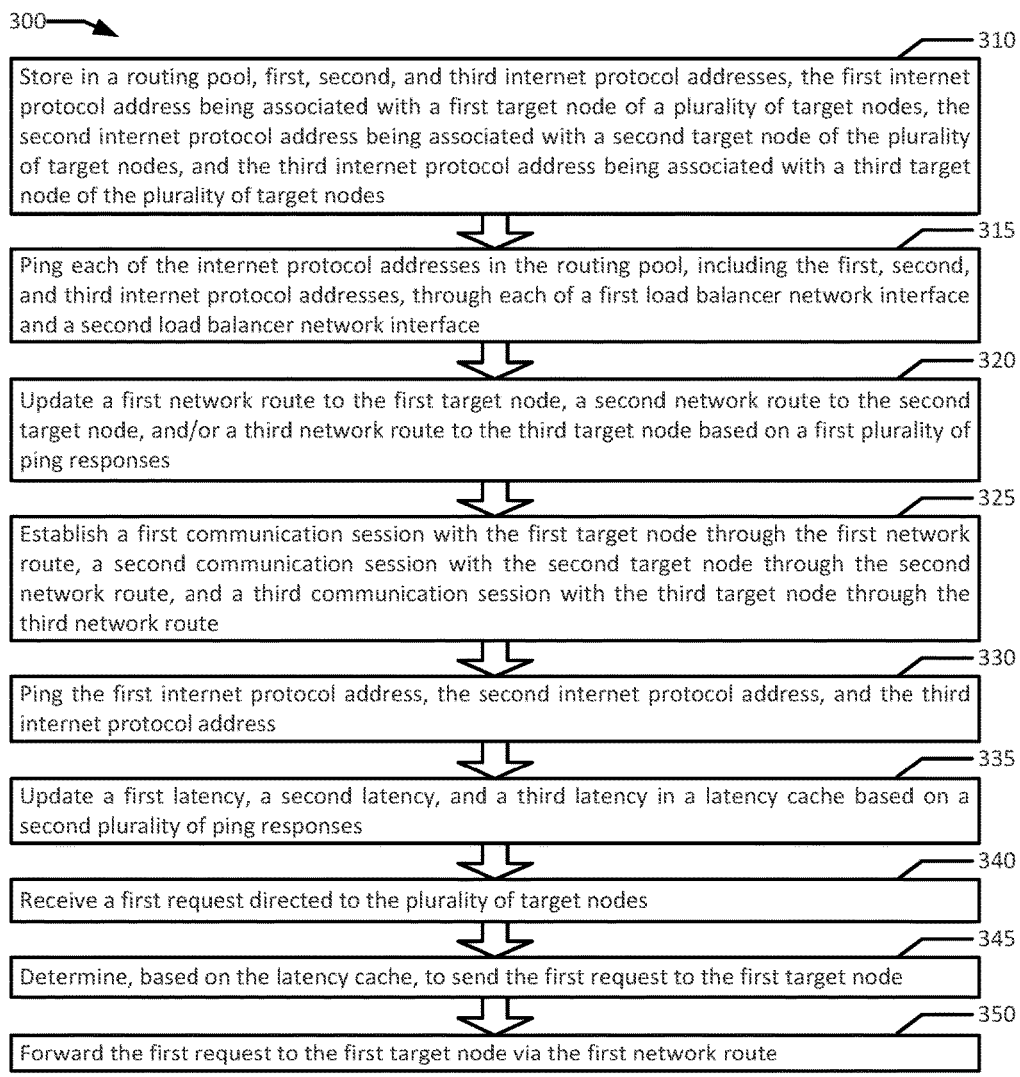
FIG. 3 is a flowchart illustrating dynamic advertisement routing according to an example of the present disclosure.

FIG. 3 is a flowchart illustrating dynamic advertisement routing according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a load balancer service 140 in conjunction with routing service 141 and latency service 142.

A plurality of internet protocol addresses is stored in a routing pool, including first, second, and third internet protocol addresses respectively associated with first, second, and third target nodes of a plurality of target nodes (block 310). For example, discovery service 241 may store, in routing pool 155, IP addresses 170, 172, and 174 which are respectively associated with NICs 250, 252, and 255A. IP addresses 170, 172, and 174 may thereby be respectively associated with nodes 210, 211, and 212. In an example, discovery service 241 may be configured to repeatedly send requests to a single domain name (e.g., a domain name of advertiser 220) and each of nodes 210, 211, and 212 may host a shared common application (e.g., ad services 230, 232, and 235). In a further example, discovery service 241 may later be randomly connected to a fourth IP address from sending requests to the domain name of advertiser 220, and add IP address 176 associated with NIC 255B to routing pool 155. In the example, discovery service 241 may be unable to distinguish that NIC 255B and IP address 176 belong to a second NIC on node 212 rather than another stand alone node. In an example, implementation of the routing pool 155 circumvents queries to DNS for requests with actual payloads by allowing for direct connections to target IP addresses (e.g., IP addresses 170, 172, 174, and 176). In a typical case, a ping with DNS to a closely situated server may take 15 ms-40 ms, while a direct ping to the IP address of the same server may take 1 ms-10 ms.

Each of the plurality of internet protocol addresses in the routing pool is pinged, including at least the first, second, and third internet protocol addresses, through each of a first load balancer network interface and a second load balancer network interface (block 315). In an example, routing service 141 may ping IP addresses 170, 172, and 174 through both of the virtual network interfaces 187A-B. In the example, routing service 141 may determine that a connection to IP address 170 is faster through virtual network interface 187A than through virtual network interface 187B. Similarly, a preference may be selected for virtual network interface 187B to connect to IP address 172, and virtual network interface 187A may be selected to connect to IP address 174.

At least one of a first network route to the first target node, a second network route to the second target node, and a third network route to the third target node is updated based on a first plurality of ping responses (block 320). In an example, routing service 141 may receive ping responses from each of IP addresses 170, 172, and 174 through each of virtual network interfaces 187A-B. In an example, routing service 141 may record the preferred virtual network interface (e.g., 187A or 187B) for connecting to each IP address (e.g., IP addresses 170, 172, and 174) in routing pool 155 to a routing table 270 as a network route (e.g., network routes 260, 262, and 264). In some examples, routing service 141 may also directly update latency cache 150 with ping latencies from the dynamic network route discovery process.

A first communication session is established with the first target node through the first network route, a second communication session with the second target node through the second network route, and a third communication session with the third target node through the third network route (block 325). In an example, routing service 141 may establish a communication session with each target IP address (e.g., IP addresses 170, 172, and 174) through each load balancer network interface (e.g., virtual network interfaces 187A-B) prior to pinging the IP addresses 170, 172, and 174. In the example, these communication sessions may be kept open to speed up sending requests through the network routes underlying the communication sessions. In another example, the latency service 142 may establish communication sessions after preferred routes have already been selected and stored in routing table 270. In another example, communication sessions may be established when the load balancer transmits the first request with an actual payload to the target IP address. For example, the communication session may be kept open after a response to the request to the target IP address is received by the load balancer. In an example, the first communication session is established through network route 260 via virtual network interface 187A, the second communication session is established through network route 262 via virtual network interface 187A, and the third communication session is established through network route 264 via virtual network interface 187B. In an example, the first communication session is established between a port on VM 116 and another port on target node 210. In the example, the respective ports may be associated respectively with an IP address of virtual network interface 187A and IP address 170 of NIC 250.

The first, second, and the third internet protocol addresses are pinged (block 330). In an example, the latency service 142 pings each of the target IP addresses (e.g., IP addresses 170, 172, and 174) in routing pool 155. In the example, latency service 142 pings the target IP addresses through a default network route (e.g., network routes 260, 262, and 264) associated with the respective target IP address and/or target node. In an example, a latency of each target IP address is computed based on a ping response from each IP address.

First, second, and third latencies in a latency cache are updated based on a second plurality of ping responses (block 335). In an example, latency service 142 may record a respective calculated latency (e.g., latencies 160, 162, and 164) in latency cache 150 for each target IP address (e.g., IP addresses 170, 172, and 174) pinged. In an example, latency service 142 may further categorize each target IP address (e.g., IP addresses 170, 172, and 174) with a performance characteristic based on a respective latency (e.g., latencies 160, 162, and 164). In an example, node 210 may be classified as high performance based on latency 160, node 211 may be classified as medium performance based on latency 162, and node 212 may be classified as low performance based on latency 164. In another example, latency service 142's ping to target IP address 174 may time out, and target IP address 174 may be classified as non-operational. In the example, load balancer 140 may not send requests with actual payload data to target IP addresses classified as non-operational. In an example, a timeout value that latency service 142 waits for a response to a ping may be configurable. In an example, after discovery service 241 discovers IP address 176 associated with NIC 255B as being an IP address of advertiser 220, routing service 141 may set network route 266 between virtual network interface 187B and NIC 255B as the default network route for IP address 176. In the example, latency service 142 may then ping IP address 176 and record a latency 166 associated with IP address 176 in latency cache 150.

A first request directed to the plurality of target nodes is received (block 340). In an example, load balancer 140 may receive a request from a publisher of content (e.g., a news website) for bids for an available ad slot (e.g., a banner ad on the front page). In the example, load balancer 140 may be configured to forward the request to advertiser 220 to solicit a bid for the ad slot. The first request is determined to be sent to the first target node based on the latency cache (block 345). In an example, latency 164 may have breached a time out threshold thereby removing IP address 174 and node 212 from contention for receiving the request. In the example, load balancer 140 may employ any form of random or pseudo random selection process to decide between forwarding the request to node 210 vs. node 211. In an example, node 210 is selected based on a random distribution. In another example, upon receipt of the request, the load balancer 140 may assess the request to classify the request with a priority. For example, the request may include a priority value and/or a timeout value, and the load balancer 140 may assign a priority classification to the request based on the priority value and/or the timeout value. In an example, a priority value may be based on an expected response deadline for loading an ad for the ad slot. A priority value may also be based on historical data relating to effectiveness of ad placements with a particular publisher (e.g., a publisher whose ad slot generates more click-throughs and/or purchases may be in higher demand and therefore receive priority over a less effective publisher's ad slot). In an example, a timeout value may be communicated by a publisher as an effective "last call" for bids, after which bids will be ignored. In another example, a timeout value may be calculated based on historical bid success data for a particular publisher. In other examples, a publisher may implement dynamic advertisement routing to enhance the response time of bid requests to ad agencies and/or directly to advertisers.

The first request is forwarded to the first target node via the first network route (block 350). In an example, load balancer 140 may forward the first request to node 210 via network route 260. In an example, a communication session on network route 260 may be established and maintained in an open state to avoid the first request from having to engage in a handshake process with target node 210. In an example, a second request classified as high priority, a third request classified as medium priority, and a fourth request classified as low priority may subsequently be received by load balancer 140. In the example, target node 210 may be high performance, target node 211 may be medium performance and target node 212 may be low performance based respectively on latencies 160, 162, and 164. In the example, the second request may be sent to target node 210 via network route 260, the second request to target node 211 via network route 262, and the third request to target node 212 via network route 264. In an example where latency 164 exceeded a latency threshold, the third request may be sent to target node 211 instead. In such an example, on a later iteration, latency service 142 may again ping IP address 174 associated with node 212, and this time, a new latency calculated from the ping response to the new ping may fall under the latency threshold. The latency service may then update latency cache 150 indicating that IP address 174 and therefore node 212 has been elevated to low performance status. In the example, another request classified as low priority received by load balancer 140 may then be sent to node 212 via network route 264.

Figure 4:
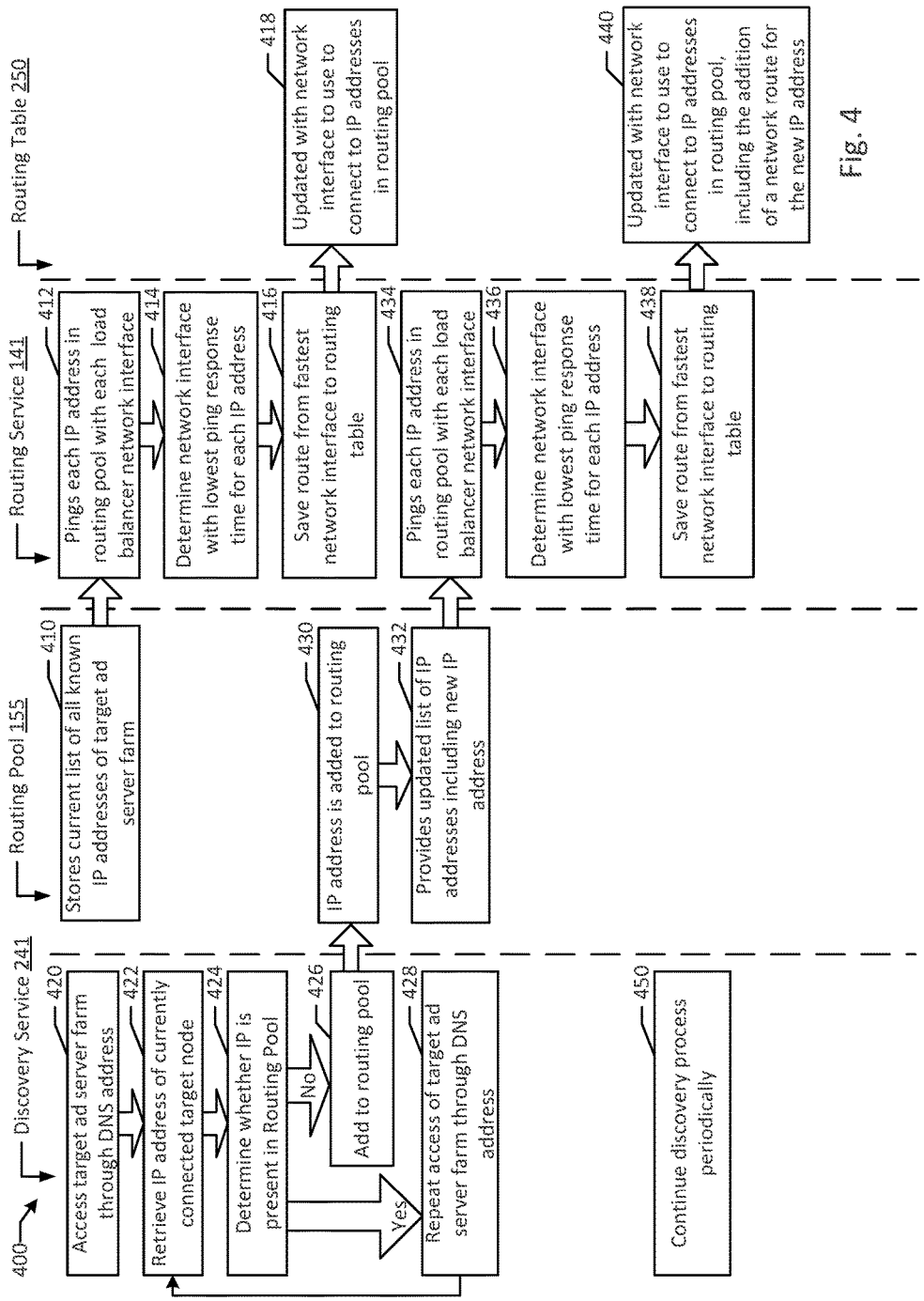
FIG. 4 is a flow diagram illustrating target discovery and route selection in a dynamic advertisement routing system according to an example of the present disclosure.

FIG. 4 is a flow diagram illustrating target discovery and route selection in a dynamic advertisement routing system according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 400, a discovery service 241 and a routing service 141 interface with a routing pool 155 and a routing table 270 to discover target IP addresses and optimize network routes to the discovered target IP addresses.

In an example, routing pool 155 stores a current list of all known IP addresses of a target ad server farm (e.g., advertiser 220) (block 410). A routing service 141 may ping each IP address in the routing pool 155 (e.g., IP addresses 170, 172, 174, and 176) with each load balancer network interface in system 400 (e.g., virtual network interfaces 187A-B) (block 412). In an example, routing service 141 may determine which network interface (e.g., virtual network interfaces 187A or 187B) has the lowest ping response time for each of IP addresses 170, 172, 174, and 176 (block 414). In the example, routing service 141 may then save the route from the fastest network interface (e.g., virtual network interfaces 187A or 187B) to each of IP addresses 170, 172, 174, and 176 to routing table 270 (block 416). In an example, routing table 270 may be updated with the network interface (e.g., virtual network interfaces 187A or 187B) to use to connect to each of IP addresses 170, 172, 174, and 176 in routing pool 155 (block 418). In some examples, each separate instance of a load balancer service (e.g., load balancer services 140 and 145) may be associated with a separate instance of routing service (e.g., routing services 141 and 146). In other examples, routing service 141 and routing service 146 may be components of a singular routing service that can access each virtual network interface (e.g., virtual network interfaces 187A-D) on each VM (e.g., VMs 116 and 118) in system 100. Similarly, routing pool 155 may be shared between load balancer service instances 140 and 145 and/or stored as separate copies accessed by each load balancer service 140 and 145 separately.

In an example, discovery service 241 accesses a target ad server farm (e.g., advertiser 220), through a DNS address (e.g., a hostname URL) (block 420). In the example, discovery service 241 may perform such access with actual payload data for an ad request, or without payload data (e.g., through pinging the hostname URL). In an example, after DNS resolves the hostname URL and allows discovery service 241 to connect to the target node, discovery service 241 may retrieve the IP address of the currently connected target node (block 422). In the example, discovery service 241 may then determine whether the retrieved IP address is present in routing pool 155 (block 424). If the IP address is not present in the routing pool 155, discovery service 241 may add the new IP address to the routing pool 155 (block 426). In the example, the new IP address is added to routing pool 155 (block 430). When queried, routing pool 155 then provides an updated list of IP addresses including the new IP address (block 432). In an example, discovery service 241 may update routing pool 155 in real time and any additional IP addresses may be pinged by routing service 141 the next time routing service 141 executes. If the IP address is present in the routing pool 155, discovery service 241 may loop back and repeat the access of the target ad server farm (e.g., advertiser 220) through the DNS address (block 428). In an example, discovery service 241 may continually execute the discovery process periodically (block 450). In the example, discovery service 241 may be configured to execute more or less frequently based on a frequency of newly discovered IP addresses. For example, discovery service 241 may be configured to execute once a minute, but when no new IP address has been discovered in thirty attempts, discovery service 241 may be dialed back to execute once every 5 minutes. In the example, if two discoveries are then made within ten attempts, discovery service 241 may be reconfigured to execute every five seconds since the two discoveries may be indicative of new servers being brought online by advertiser 220 with a new range of IP addresses.

In an example, routing service 141 may again ping each IP address in the routing pool 155 (e.g., IP addresses 170, 172, 174, and 176) with each load balancer network interface in system 400 (e.g., virtual network interfaces 187A-B) including pinging the new IP address discovered by discovery service 241 (block 434). In the example, routing service 141 may determine which network interface (e.g., virtual network interfaces 187A or 187B) has the lowest ping response time for each of IP addresses 170, 172, 174, 176, and the new IP address (block 414). In the example, routing service 141 may then save the route from the fastest network interface (e.g., virtual network interfaces 187A or 187B) to each of IP addresses 170, 172, 174, 176, and the new IP address to routing table 270 (block 438). In an example, routing table 270 may be updated with the network interface (e.g., virtual network interfaces 187A or 187B) to use to connect to each of IP addresses 170, 172, 174, 176, and the new IP address in routing pool 155 (block 440). In an example, routing service 141 may continually execute to validate the current fastest network route to each target IP address. For example, in a system with ten load balancer network interfaces, a routing service would continually rotate through each load balancer network interface and target IP address combination to keep preferred routes up to date in the routing table. In an example, if a target IP address is unresponsive when pinged from multiple load balancer network interfaces, a routing service may skip the remaining load balancer network interfaces for that target IP address until a later rotation as the server for the target IP address is likely offline.

Figure 5:
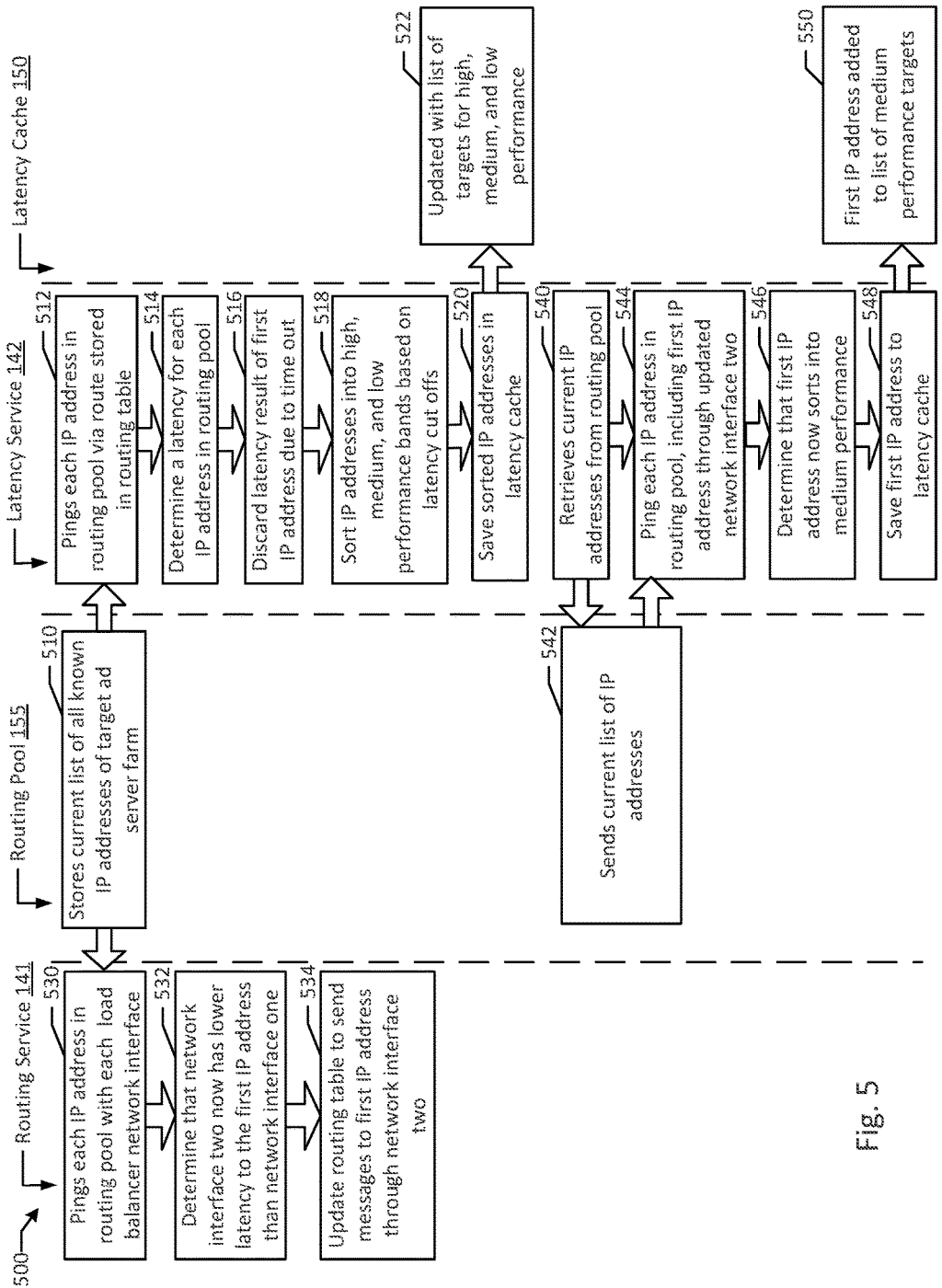
FIG. 5 is a flow diagram illustrating target prioritization through latency detection in a dynamic advertisement routing system according to an example of the present disclosure.

FIG. 5 is a flow diagram illustrating target prioritization through latency detection in a dynamic advertisement routing system according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, a routing service 141 and a latency service 142 interface with a routing pool 155 and a latency cache 150 to prioritize target IP addresses for requests.

In an example, routing pool 155 stores a current list of all known IP addresses of a target ad server farm (e.g., advertiser 220) (block 510). A latency service 142 may ping each IP address in the routing pool 155 (e.g., IP addresses 170, 172, 174, and 176) via a default network route stored in routing table 270 (block 512). In an example, latency service 142 may ping the target IP addresses 170, 172, 174, and 176 much more frequently than routing service 141, since latency service 142 only pings once per target address per cycle vs. once for each load balancer network interface in the case of routing service 141. In an example, latency service 142 determines a latency (e.g., latency 160, 162, 164, and 166) for each IP address in routing pool 155 (e.g., IP addresses 170, 172, 174, and 176) (block 514). For example, latency 160 may be calculated based on a ping response time to IP address 170. In an example, latency service 142 may discard the latency result for the first IP address 170 due to the ping to IP address 170 timing out (block 516). In an example, discarding a latency result may keep any actual ad requests from being sent to IP address 170 since no entry would be made for IP address 170 in latency cache 150. In an example, the remaining IP addresses (e.g., IP addresses 172, 174, and 176) may be sorted into high, medium, and low performance bands based on latency cut offs (block 518). For example, responses taking over 10 ms may be discarded as time outs, responses over 7 ms may be classified as low performance, responses over 5 ms may be classified as medium performance, and responses faster than 5 ms may be classified as high performance. In an example, IP address 172 may be high performance, IP address 174 may be medium performance, and IP address 176 may be low performance. In an example, the sorted IP addresses 172, 174, and 176 may be saved in latency cache 150 (block 520). Latency cache 150 may then be updated with a list of targets for high, medium, and low performance (block 522). In an example, IP addresses (e.g., IP addresses 172, 174, and 176) may be stored in entries in latency cache 150 along with numerical latency values. In another example, latency cache 150 may store IP addresses (e.g., IP addresses 172, 174, and 176) in performance bands without numerical latency values.

In an example, routing service 141 again pings each IP addresses (e.g., IP addresses 170, 172, 174, and 176) in routing pool 155 with each load balancer network interface (e.g., virtual network interfaces 187A-D) (block 530). In the example, routing service 141 may determine that virtual network interface 187B now has lower latency to IP address 170 than virtual network interface 187A (block 532). Routing service 141 may then update routing table 270 to send messages to IP address 170 through virtual network interface 187B instead of virtual network interface 187A (block 534). In an example, latency service 142 may again retrieve a current list of IP addresses (e.g., IP addresses 170, 172, 174, and 176) from routing pool 155 (block 540). In the example, routing pool 155 may send the current list of IP addresses (e.g., IP addresses 172, 174, and 176) (block 542). In an example, IP address 170 is included in the list from routing pool 155 even though latency service 142's previous ping to IP address 170 timed out. In an example, latency service 142 pings each IP addresses (e.g., IP addresses 172, 174, and 176) in routing pool 155, including pinging IP address 170 through virtual network interface 187B instead of virtual network interface 187A (block 544). For example, routing service 141 may have updated the network route in routing table 270 for IP address 170 prior to latency service 142 pinging IP address 170 again. In an example, latency service 142 may determine that IP address 170 now sorts into the medium performance band (block 546). In an example, latency service 142 saves IP address 170 to latency cache 150 (block 142). In the example, IP address 170 is added to the list of medium performance targets in latency cache 150 (block 550). In some examples, no other changes may have occurred for the performance banding of IP addresses 172, 174, and 176. In other examples, the performance banding of IP addresses 172, 174, and 176 may also be readjusted based on the latest pinging by latency service 142, and may be updated in latency cache 150. In an example, blocks 512-522 may be performed independently of blocks 530-540, with the latency service 142 executing multiple times to test the current performance of the IP addresses 170, 172, 174, and 176 for each time the routing service 141 tests for preferable network routes.

In an example, a system hosting a load balancer service along with a routing service and a latency service may have eight, sixteen, or even one hundred or more network interfaces whether physical or virtualized. In the example, the routing service may require significantly longer to ping each IP address in a routing pool than the latency service, because of the multiplicative effect on the number of pings that are required to work through the list of IP addresses caused by the addition of more network interfaces. In addition, the latency service may be configured with a more aggressive time out than the routing service where the routing service may be confirming whether a target node is active, while the latency service is prioritizing whether the given target node is performing well enough to be used for a request with an active payload. Similarly, the routing service may trigger significantly more timeouts (e.g., where multiple routes to the same struggling or inoperative target node are tested). For example, in a system with ten network interfaces, the latency service may be configured to time out after 20 ms, while the routing service may be configured to time out after 200 ms. In the example, if the ten network interfaces are used to access one hundred target IP addresses, the latency service would take, as a rough upper bound, at most 2,000 ms to execute, (e.g., 20 ms to time out and one hundred target IP addresses to try). In the example, 20 ms may be configured as a lower bound for "low performance" connections. In the same example, the routing service may take up to 200,000 ms to execute if every possible combination timed out. In a typical system with ten network interfaces, the routing service may typically take fifteen to twenty times as long to execute as the latency service. Therefore, the separation of the polling of the latency service and the routing service allows prioritization and performance data in the latency cache to be significantly more up to date. In an example, the latency service may also consider a wider range of data than the latest ping result in determining a performance band for a given target node. For example, a rolling and/or weighted average ping response time over a given time period (e.g., five minutes) may be used. In an example, ping response time may be combined with other factors, such as a quantity of outstanding requests, to determine the performance band for a given target node. For example, a target node that has not responded yet to two or more previous requests may be dropped by a performance band (e.g., high to medium or medium to low).

Figure 6:
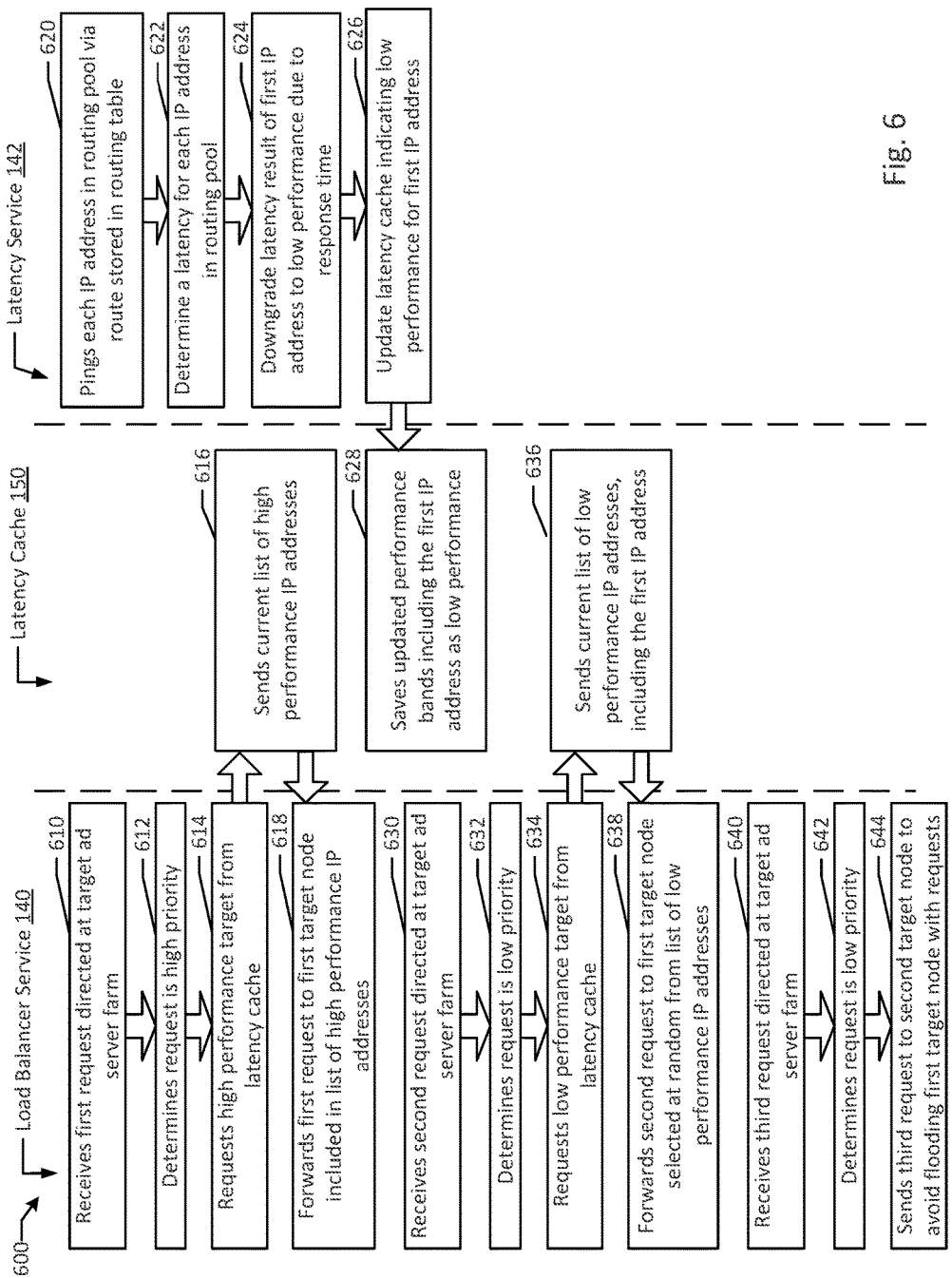
FIG. 6 is a flow diagram illustrating dynamic request handling in a dynamic advertisement routing system according to an example of the present disclosure.

FIG. 6 is a flow diagram illustrating dynamic request handling in a dynamic advertisement routing system according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 600, a load balancer service 140 and a latency service 142 interface with a latency cache 150 to send requests to selected target IP addresses.

In an example, load balancer service 140 receives a first request directed at a target ad server farm (e.g., advertiser 220) (block 610). In the example, load balancer service 140 determines that the request is a high priority request (block 612). For example, the request may be flagged with a time stamp indicating a short window for responding with an ad bid for an ad slot. Alternatively, the source of the request (e.g., a publisher) may be flagged in load balancer service 140 as particularly effective and therefore responding with a bid on time is particularly important. In an example, load balancer service 140 requests a high performance target from latency cache 150 (block 614). In the example, latency cache 150 may respond by sending load balancer service 140 the current list of high performance IP addresses (block 616). In an example, load balancer service 140 forwards the first request to target node 210 included in the list of high performance IP addresses (e.g., IP address 170) (block 618). In an example, IP address 170 may be selected from the list of high performance IP addresses randomly by load balancer service 140. In another example, latency cache 150 may send only one random IP address that is flagged as high performance rather than the whole list of high performance IP addresses. In an example, load balancer service 140 tracks which target IP addresses have recently received requests. For example, load balancer service 140 may ensure that no single target IP address is flooded with requests. In the example, if every load balancer service (e.g., 140 and 145) sent each request to the target IP address in latency cache 150 with the current fastest response time, the target node associated with the target IP address may be unable to respond to the requests quickly enough to respond in real-time, resulting in the queueing of requests and sub-optimal response times. In an example, rather than sorting target IP addresses into performance bands, an alternative sorting method may be used (e.g., sorting by ping response times directly). In such an example, a request may be sent to any target IP address whose calculated response time may meet a critical timeout value for responding to the request.

Latency service 142 may execute concurrently with the processing of the first request by load balancer service 140. In an example, latency service 142 may ping each IP address (e.g., IP addresses 170, 172, 174, and 176) in routing pool 155 via a network route (e.g., network routes 260, 262, 264, and 266) stored in routing table 270 (block 620). In an example, latency service 142 may determine a latency (e.g., latencies 160, 162, 164, and 166) for each IP address 170, 172, 174, and 176 in routing pool 155 (block 622). In the example, the latency result 160 of IP address 170 may be downgraded to low performance due to the response time of the latest ping from latency service 142 (block 624). In an example, traffic to IP address 170 may have become congested due to its previous low latency and high performance. In another example, a switch in the route to IP address 170 may be restarting for maintenance. In an example, latency service 142 updates latency cache 150 indicating that IP address 170 is now low performance (block 626). Latency cache 150 may save the updated performance bands for the various IP addresses 170, 172, 174 and 176, including saving IP address 170 as low performance (block 628).

In an example, load balancer service 140 may receive a second request directed at the target ad server farm (e.g., advertiser 220) (block 630). In the example, load balancer service 140 determines that the second request is low priority (block 632). For example, the second request may have a response time deadline that should be met even by a low performance target node (e.g., the updated node 210). Alternatively, historical data may show that bids to the publisher for the second request rarely win an ad slot and/or generate low returns even when bids are won. In an example, load balancer service 140 requests a low performance target from latency cache 150 (block 634). In the example, latency cache 150 responds by sending a current list of low performance IP addresses, including IP address 170 (block 636). Load balancer service 140 then forwards the second request to node 210 (e.g., IP address 170) selected at random from the list of low performance IP addresses (block 638). In an example, load balancer service 140 keeps track of where requests have been sent. In an example, load balancer service 140 receives a third request directed at the target ad server farm (e.g., advertiser 220) (block 640). In an example, load balancer service 140 may receive the third request prior to receiving responses to the first two requests from IP address 170. In the example, the third request may be determined to be low priority (block 642). In an example, load balancer service 140 may again request an updated list of low performance IP addresses from latency cache 150, and may receive an updated list of low performance IP addresses. In another example, load balancer service 140 may re-use the previous list of low performance IP addresses due to the temporal proximity between receiving the second and third requests. In an example, load balancer service 140 sends the third request to target node 211 to avoid flooding target node 210 with requests (block 644). In the example, both IP address 170 and IP address 172 may be on the list of low performance IP addresses, but IP address 170 may be removed from contention for receiving the third request due to the first two outstanding requests being processed by target node 210.

In an example, a connection is constantly maintained between a network interface (e.g., virtual network interfaces 187A-D) of system 100, and each target IP address (e.g., IP addresses 170, 172, 174, and 176) of advertiser 220 to allow a request to be sent to a selected IP address (e.g., IP addresses 170, 172, 174, or 176) without requiring a new handshake to establish a connection. In an example, connecting directly to a target IP address bypassing DNS may decrease latency by up to 20 ms. In an example, by eliminating sending requests to target nodes temporarily experiencing networking or other difficulties, failures and other outliers may be greatly reduced. In various embodiments, employing dynamic advertisement routing may reduce average response times for ad bid requests from 500 ms-1,000 ms down to 200 ms or less while eliminating the majority of bids lost to timeout. In an example, the larger the system grows (e.g., with more network interfaces and more connections) the better the performance of the selected top performing network route may be. For example, if one hundred network interfaces are tested for connecting to a target IP address, the top performer of the one hundred connections would be likely be at least in the top ten percent of possible routing performances. The more target nodes are available, the more high performing load balancer network interface and target node combinations may be found. As such, the larger the system, the stronger the performance of a system executing dynamic advertisement routing. For example, in a system with one hundred target IP addresses with only one load balancer network interface and therefore selecting a median performing network route for each target IP address, potentially only five of the target IP addresses may qualify as high performance targets. However, by increasing to ten load balancer network interfaces with dynamic advertisement routing to select for the top performing route of the ten possible routes for each target IP address, thirty of the target IP addresses may then qualify as high performance targets. With one hundred network interfaces, potentially seventy of the target IP addresses may qualify as high performance due to being able to select for extremely high performing network routes to each target IP address.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of network latency optimization, the system comprising:
   a memory storing a latency cache and a routing pool, wherein the routing pool stores a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;
   one or more processors;
   a plurality of load balancer network interfaces including a first load balancer network interface and a second load balancer network interface; and
   a load balancer including:
     a routing service; and
     a latency service,
   the load balancer service executing on the one or more processors to:
   ping, by the routing service, each of the plurality of internet protocol addresses in the routing pool, including at least the first internet protocol address, the second internet protocol address, and the third internet protocol address, through each of the first load balancer network interface and the second load balancer network interface;
   select, by the routing service, at least one of a first network route to the first target node via the first load balancer network interface, a second network route to the second target node via the first load balancer network interface, and a third network route to the third target node based on a first plurality of ping responses via the first load balancer network interface;
   establish a first communication session with the first target node through the first network route, a second communication session with the second target node through the second network route, and a third communication session with the third target node through the third network route;
   ping, by the latency service, the first internet protocol address, the second internet protocol address, and the third internet protocol address;
   update, by the latency service, a first latency, a second latency, and a third latency in a latency cache based on a second plurality of ping responses, wherein the third latency exceeds a latency threshold;
   receive, by the load balancer, a first request directed to the plurality of target nodes;
   determine, based on the latency cache, to send the first request to the first target node;
   forward, by the load balancer, the first request to the first target node via the first network route;
   send, by the load balancer, a second request directed to the plurality of target nodes to one of the first target node and the second target node; and
   send, by the load balancer, a third request directed to the plurality of target nodes to the third target node after the latency service updates the latency cache with a fourth latency of a fourth network route to the third target node via the second load balancer network interface, wherein the fourth latency is under the latency threshold.

2. The system of claim 1, wherein the load balancer is configured to:
   classify a fourth request as high priority, a fifth request as medium priority, and a sixth request as low priority; and
   send the fourth request to the first target node, the fifth request to the second target node, and the sixth request to the third target node based on the first latency, the second latency, and the third latency.

3. The system of claim 2, wherein the fourth request is classified as high priority based on at least one of a priority value and a timeout value in the fourth request.

4. The system of claim 2, wherein the first target node is classified as high performance based on the first latency, the second target node is classified as medium performance based on the second latency, and the third target node is classified as low performance based on the third latency.

5. The system of claim 1, wherein the plurality of target nodes all host copies of a common application and share a common domain name.

6. The system of claim 5, wherein the load balancer discovers a fourth target node of the plurality of target nodes based on a request sent to the common domain name, and updates a fifth network route to the fourth target node.

7. The system of claim 1, wherein the first target node has a fourth internet protocol address in addition to the first internet protocol address, and the load balancer adds a fifth latency associated with the first target node to the latency cache.

8. The system of claim 7, wherein the first internet protocol address is associated with a first target network interface of the first target node, the second internet protocol address is associated with a second target network interface of the second target node, the third internet protocol address is associated with a third target network interface of the third target node, and the fourth internet protocol address is associated with a fourth target network interface of the first target node.

9. The system of claim 8, wherein the first communication session is opened between a first port of the first load balancer network interface and a second port of the first target network interface.

10. The system of claim 1, wherein the first communication session is kept alive after a response to the first request is received by the load balancer.

11. The system of claim 1, wherein a fifth latency to the first internet protocol address through the first load balancer network interface is lower than a sixth latency to the first internet protocol address through the second load balancer network interface.

12. The system of claim 1, wherein the first network route, the second network route, and the third network route are stored in a routing table.

13. The system of claim 12, wherein the routing table directs traffic to the first internet protocol address to the first network route, traffic to the second internet protocol address to the second network route, and traffic to the third internet protocol address to the third network route.

14. The system of claim 13, wherein the latency service periodically pings each internet protocol address in the routing pool and updates the latency cache, wherein latency service routes pings based on the routing table.

15. The system of claim 12, wherein the routing service periodically pings each internet protocol address in the routing pool through each of the plurality of load balancer network interfaces and updates the routing table.

16. A method of network latency optimization, the method comprising:
- storing, in a routing pool, a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;
- pinging each of the plurality of internet protocol addresses in the routing pool, including at least the first internet protocol address, the second internet protocol address, and the third internet protocol address, through each of a first load balancer network interface and a second load balancer network interface;
- selecting, at least one of a first network route to the first target node via the first load balancer network interface, a second network route to the second target node via the first load balancer network interface, and a third network route to the third target node based on a first plurality of ping responses via the first load balancer network interface;
- establishing a first communication session with the first target node through the first network route, a second communication session with the second target node through the second network route, and a third communication session with the third target node through the third network route;
- pinging the first internet protocol address, the second internet protocol address, and the third internet protocol address;
- updating a first latency, a second latency, and a third latency in a latency cache based on a second plurality of ping responses, wherein the third latency exceeds a latency threshold;
- receiving a first request directed to the plurality of target nodes;
- determining, based on the latency cache, to send the first request to the first target node;
- forwarding the first request to the first target node via the first network route;
- sending a second request directed to the plurality of target nodes to one of the first target node and the second target node; and
- sending a third request directed to the plurality of target nodes to the third target node after the latency service updates the latency cache with a fourth latency of a fourth network route to the third target node via the second load balancer network interface, wherein the fourth latency is under the latency threshold.

17. A computer-readable non-transitory storage medium storing executable instructions of network latency optimization, which when executed by a computer system, cause the computer system to:
- store, in a routing pool, a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;
- ping each of the plurality of internet protocol addresses in the routing pool, including at least the first internet protocol address, the second internet protocol address, and the third internet protocol address, through each of a first load balancer network interface and a second load balancer network interface;
- select at least one of a first network route to the first target node via the first load balancer network interface, a second network route to the second target node via the first load balancer network interface, and a third network route to the third target node via the first load balancer network interface based on a first plurality of ping responses;
- establish a first communication session with the first target node through the first network route, a second communication session with the second target node through the second network route, and a third communication session with the third target node through the third network route;
- ping the first internet protocol address, the second internet protocol address, and the third internet protocol address;
- update a first latency, a second latency, and a third latency in a latency cache based on a second plurality of ping responses, wherein the third latency exceeds a latency threshold;
- receive a first request directed to the plurality of target nodes;
- determine, based on the latency cache, to send the first request to the first target node;
- forward the first request to the first target node via the first network route;
- send a second request directed to the plurality of target nodes to one of the first target node and the second target node; and
- send a third request directed to the plurality of target nodes to the third target node after the latency service updates the latency cache with a fourth latency of a fourth network route to the third target node via the second load balancer network interface, wherein the fourth latency is under the latency threshold.

18. A system of network latency optimization, the system comprising:
- a memory storing a latency cache and a routing pool, wherein the routing pool stores a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;
- one or more processors;
- a plurality of load balancer network interfaces including a first load balancer network interface and a second load balancer network interface; and
- a load balancer including:
  - a routing service; and
  - a latency service,
- the load balancer service executing on the one or more processors to:

ping, by the routing service, each of the plurality of internet protocol addresses in the routing pool, including at least the first internet protocol address, the second internet protocol address, and the third internet protocol address, through each of the first load balancer network interface and the second load balancer network interface;

select, by the routing service, at least one of a first network route to the first target node via the second load balancer network interface, a second network route to the second target node via the first load balancer network interface, and a third network route to the third target node via the first load balancer network interface based on a first plurality of ping responses;

establish a first communication session with the first target node through the first network route, a second communication session with the second target node through the second network route, and a third communication session with the third target node through the third network route;

ping, by the latency service, the first internet protocol address, the second internet protocol address, and the third internet protocol address;

update, by the latency service, a first latency, a second latency, and a third latency in a latency cache based on a second plurality of ping responses;

receive, by the load balancer, a first request directed to the plurality of target nodes;

determine, based on the latency cache, to send the first request to the first target node;

forward, by the load balancer, the first request to the first target node via the first network route;

select, by the routing service, a fourth network route, wherein a fourth latency to the first internet protocol address through the fourth network route via the first load balancer network interface is lower than a fifth latency to the first internet protocol address through a fifth network route via the second load balancer network interface; and send, by the load balancer, a second request to the first target node through the fourth network route.

19. The system of claim 18, wherein the load balancer is configured to:

classify a third request as high priority, a fourth request as medium priority, and a fifth request as low priority; and send the third request to the first target node, the fourth request to the second target node, and the fifth request to the third target node based on the first latency, the second latency, and the third latency.

20. The system of claim 19, wherein the third request is classified as high priority based on at least one of a priority value and a timeout value in the third request.

21. The system of claim 19, wherein the first target node is classified as high performance based on the first latency, the second target node is classified as medium performance based on the second latency, and the third target node is classified as low performance based on the third latency.

22. The system of claim 18, wherein the plurality of target nodes all host copies of a common application and share a common domain name.

23. The system of claim 22, wherein the load balancer discovers a fourth target node of the plurality of target nodes based on a request sent to the common domain name, and updates a sixth network route to the fourth target node.

24. The system of claim 18, wherein the first target node has a fourth internet protocol address in addition to the first internet protocol address, and the load balancer adds a sixth latency associated with the first target node to the latency cache.

25. The system of claim 24, wherein the first internet protocol address is associated with a first target network interface of the first target node, the second internet protocol address is associated with a second target network interface of the second target node, the third internet protocol address is associated with a third target network interface of the third target node, and the fourth internet protocol address is associated with a fourth target network interface of the first target node.

26. The system of claim 25, wherein the first communication session is opened between a first port of the first load balancer network interface and a second port of the first target network interface.

27. The system of claim 18, wherein the third latency exceeds a latency threshold and a second request directed to the plurality of target nodes is sent to one of the first target node and the second target node.

28. The system of claim 27, wherein the load balancer sends a third request directed to the plurality of target nodes to the third target node after the latency service updates the latency cache with a sixth latency associated with the third target node, wherein the sixth latency is under the latency threshold.

29. The system of claim 18, wherein the first communication session is kept alive after a response to the first request is received by the load balancer.

30. The system of claim 18, wherein the first network route, the second network route, and the third network route are stored in a routing table.

31. The system of claim 30, wherein the routing table directs traffic to the first internet protocol address to the first network route, traffic to the second internet protocol address to the second network route, and traffic to the third internet protocol address to the third network route.

32. The system of claim 31, wherein the latency service periodically pings each internet protocol address in the routing pool and updates the latency cache, wherein the latency service routes pings based on the routing table.

33. The system of claim 30, wherein the routing service periodically pings each internet protocol address in the routing pool through each of the plurality of load balancer network interfaces and updates the routing table.

34. A method of network latency optimization, the method comprising:

storing, in a routing pool, a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;

pinging each of the plurality of internet protocol addresses in the routing pool, including at least the first internet protocol address, the second internet protocol address, and the third internet protocol address, through each of a first load balancer network interface and a second load balancer network interface;

selecting, at least one of a first network route to the first target node via the second load balancer network interface, a second network route to the second target node via the first load balancer network interface, and a third network route to the third target node via the first load balancer network interface based on a first plurality of ping responses;

establishing a first communication session with the first target node through the first network route, a second communication session with the second target node through the second network route, and a third communication session with the third target node through the third network route;

pinging the first internet protocol address, the second internet protocol address, and the third internet protocol address;

updating a first latency, a second latency, and a third latency in a latency cache based on a second plurality of ping responses;

receiving a first request directed to the plurality of target nodes;

determining, based on the latency cache, to send the first request to the first target node;

forwarding the first request to the first target node via the first network route;

selecting a fourth network route, wherein a fourth latency to the first internet protocol address through the fourth network route via the first load balancer network interface is lower than a fifth latency to the first internet protocol address through a fifth network route via the second load balancer network interface; and sending a second request to the first target node through the fourth network route.

35. A computer-readable non-transitory storage medium storing executable instructions of network latency optimization, which when executed by a computer system, cause the computer system to:

store, in a routing pool, a plurality of internet protocol addresses including a first internet protocol address, a second internet protocol address, and a third internet protocol address, and the first internet protocol address is associated with a first target node of a plurality of target nodes, the second internet protocol address is associated with a second target node of the plurality of target nodes, and the third internet protocol address is associated with a third target node of the plurality of target nodes;

ping each of the plurality of internet protocol addresses in the routing pool, including at least the first internet protocol address, the second internet protocol address, and the third internet protocol address, through each of a first load balancer network interface and a second load balancer network interface;

select at least one of a first network route to the first target node via the second load balancer network interface, a second network route to the second target node via the first load balancer network interface, and a third network route to the third target node via the first load balancer network interface based on a first plurality of ping responses;

establish a first communication session with the first target node through the first network route, a second communication session with the second target node through the second network route, and a third communication session with the third target node through the third network route;

ping the first internet protocol address, the second internet protocol address, and the third internet protocol address;

update a first latency, a second latency, and a third latency in a latency cache based on a second plurality of ping responses;

receive a first request directed to the plurality of target nodes;

determine, based on the latency cache, to send the first request to the first target node; and forward the first request to the first target node via the first network route;

select a fourth network route, wherein a fourth latency to the first internet protocol address through the fourth network route via the first load balancer network interface is lower than a fifth latency to the first internet protocol address through a fifth network route via the second load balancer network interface; and send, by the load balancer, a second request to the first target node through the fourth network route.

* * * * *